United States Patent [19]

Larson

[11] Patent Number: 4,648,349

[45] Date of Patent: Mar. 10, 1987

[54] KITTY LITTER BOX

[75] Inventor: Conrad M. Larson, LaMoure, N. Dak.

[73] Assignee: Midwest Green Products, Inc., Moorhead, Minn.

[21] Appl. No.: 757,617

[22] Filed: Jul. 22, 1985

[51] Int. Cl.⁴ .............................................. A01K 1/00
[52] U.S. Cl. ....................................................... 119/1
[58] Field of Search .............. 119/1; 229/17 R, 31 FS

[56] References Cited

U.S. PATENT DOCUMENTS

| | | | |
|---|---|---|---|
| 2,214,813 | 9/1940 | Guyer | 229/31 FS |
| 2,980,308 | 4/1961 | Bolding | 229/31 FS |
| 3,162,350 | 12/1964 | Miller | 229/31 FS |
| 3,286,691 | 11/1966 | McFadden | 119/1 |
| 3,377,990 | 4/1968 | Mitchell | 119/1 |
| 3,826,229 | 7/1974 | Classe et al. | 119/1 |
| 4,271,787 | 6/1981 | Wellman et al. | 119/1 |
| 4,305,544 | 12/1981 | Noonan | 229/35 |
| 4,441,451 | 4/1984 | Neal | 119/1 |
| 4,501,226 | 2/1985 | Bienvenu et al. | 119/1 |
| 4,553,671 | 11/1985 | Cheeseman | 119/1 |

Primary Examiner—Robert P. Swiatek
Attorney, Agent, or Firm—Kinney & Lange

[57] ABSTRACT

A disposable box for holding kitty litter and having a cover wall spaced from the bottom wall of the box, and also spaced downwardly from the upper edge and which has perforations to define a punch-out cover panel which can be removed. The box space below the cover wall is filled with kitty litter or animal litter and is shipped and sold that way. When the box is to be used, the punch-out removable cover panel is pulled out and the kitty litter is available for use. The box is made with tapered side and end walls so that the boxes will nest and the bottom of one box will fit inside the second box with its bottom wall being supported on the cover wall that covers the kitty litter in the box. When the kitty litter has served its purpose, the box is disposed of by placing it inside a plastic garbage bag or the like.

5 Claims, 4 Drawing Figures

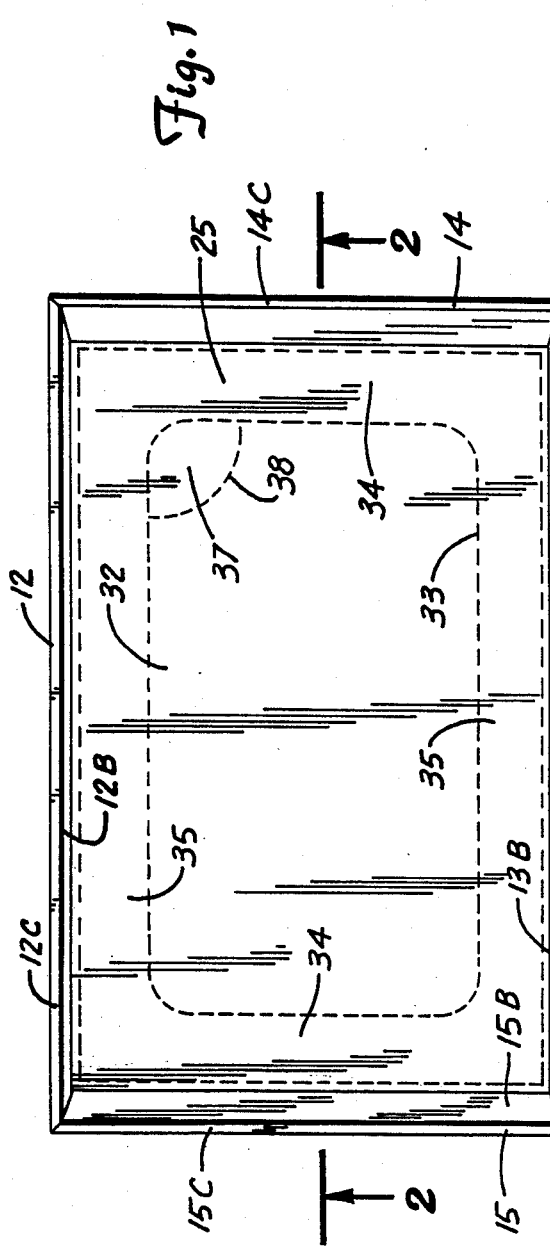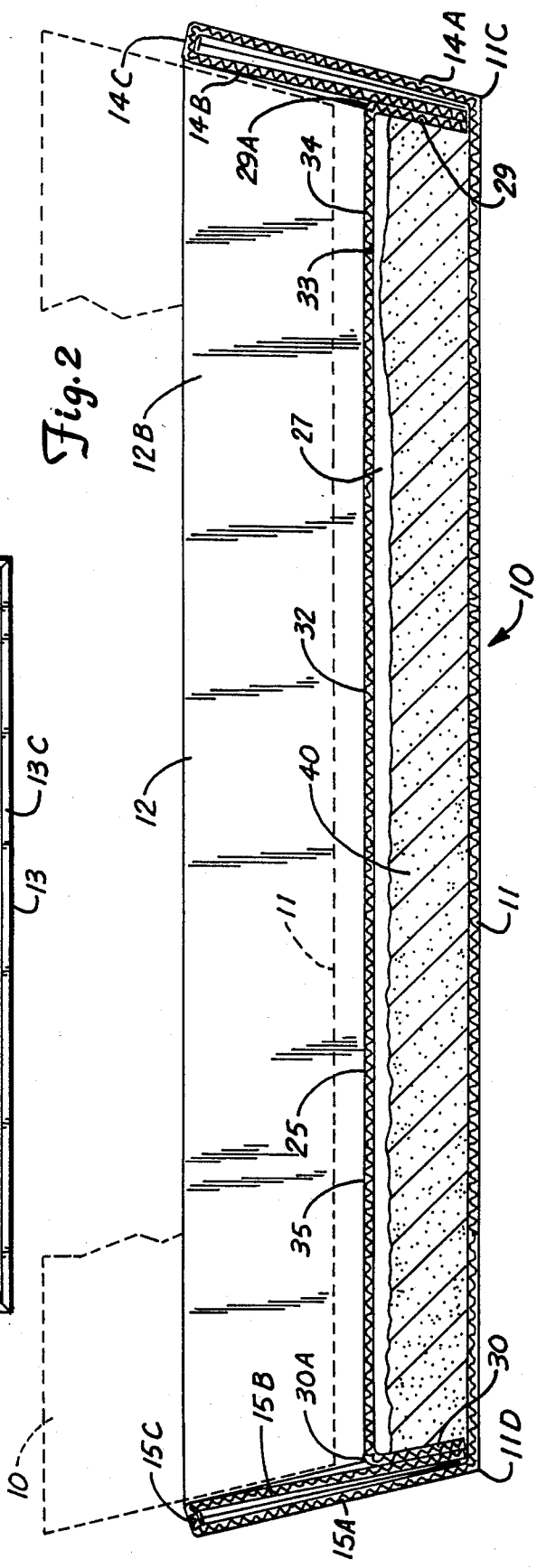

KITTY LITTER BOX

BACKGROUND OF THE INVENTION

1. Field of the Invention

The present invention relates to a disposable box containing litter for animals that has a compartment formed for the storage of litter and which can be used merely by removing a partially punched-out cover panel.

2. Description of the Prior Art

U.S. Pat. No. 4,271,787 shows a disposable container for animal litter, which has an outer container that has peripheral, upright side walls that are folded upwardly from a closed storage position for use. A plurality of individual packets of litter are stored in the lower portions of the container. The individual packets are stored and sold in the box and each packet has a removable top cover so that the individual packets are used in sequence, and then each is removed from the box and replaced as necessary.

A disposable cat litter box is also shown in U.S. Pat. No. 4,305,544 which comprises a multi-panel box that has folded in ledges at the upper edge of the box to keep the kitty litter from being easily kicked out of the box itself.

U.S. Pat. No. 4,501,226 also shows a disposable pet litter container with side walls that fold upwardly to provide a shield. The box is then filled with litter as needed, and the box is made to be liquid tight, and can be covered when the added litter has been used so that the box can be discarded.

U.S. Pat. No. 4,441,451 also shows a similar disposable pet litter box that is designed to have a litter package inside the box when it is shipped. The box is then opened for use and the litter from the package is added to the box as needed.

While the prior art has shown the desirability of disposable pet litter boxes, boxes which are self-contained, and are strong enough so that they can be stacked several high for shipment as well as arranged conveniently on a standard pallet are still needed.

SUMMARY OF THE INVENTION

The present invention relates to a disposable cat litter box that has an outer compartment formed by folded panels of cardboard or similar material that interlock to form side and end walls that taper generally upwardly and outwardly from a bottom wall. An inserted cardboard cover wall is made to be supported at a distance that is spaced both from the upper edge of the formed box compartment and from the bottom wall of the box. Prior to insertion of the cover wall, the box is partially filled with the cat or animal litter material, the cover is put into place and then the box is ready to be shipped. The cover wall fits snuggly inside and against the inside walls of the box to form a litter compartment, and does not become dislodged during shipment. The cover wall has a removable cover panel defined by perforations or partial punch-out slits. The removable cover panel is of substantial size, but slightly smaller than the box so that when the cover panel is removed from the cover wall, the cat litter is exposed for use in a substantial area of the box, but ledges are left around the periphery of the box to keep the litter material from being easily kicked up the side walls and out of the box.

The partial punch-out cover panel is easily removed for use, yet retains the litter material in the box during shipment. Once the litter is used, the panel can be placed over the top, or the entire box can be disposed of merely by placing it into a suitably sized plastic garbage bag.

BRIEF DESCRIPTION OF THE DRAWINGS

FIG. 1 is a top plan view of a cat litter box made according to the present invention;

FIG. 2 is a sectional view taken on line 2—2 of FIG. 1;

DETAILED DESCRIPTION OF THE PREFERRED EMBODIMENTS

Figure 3:
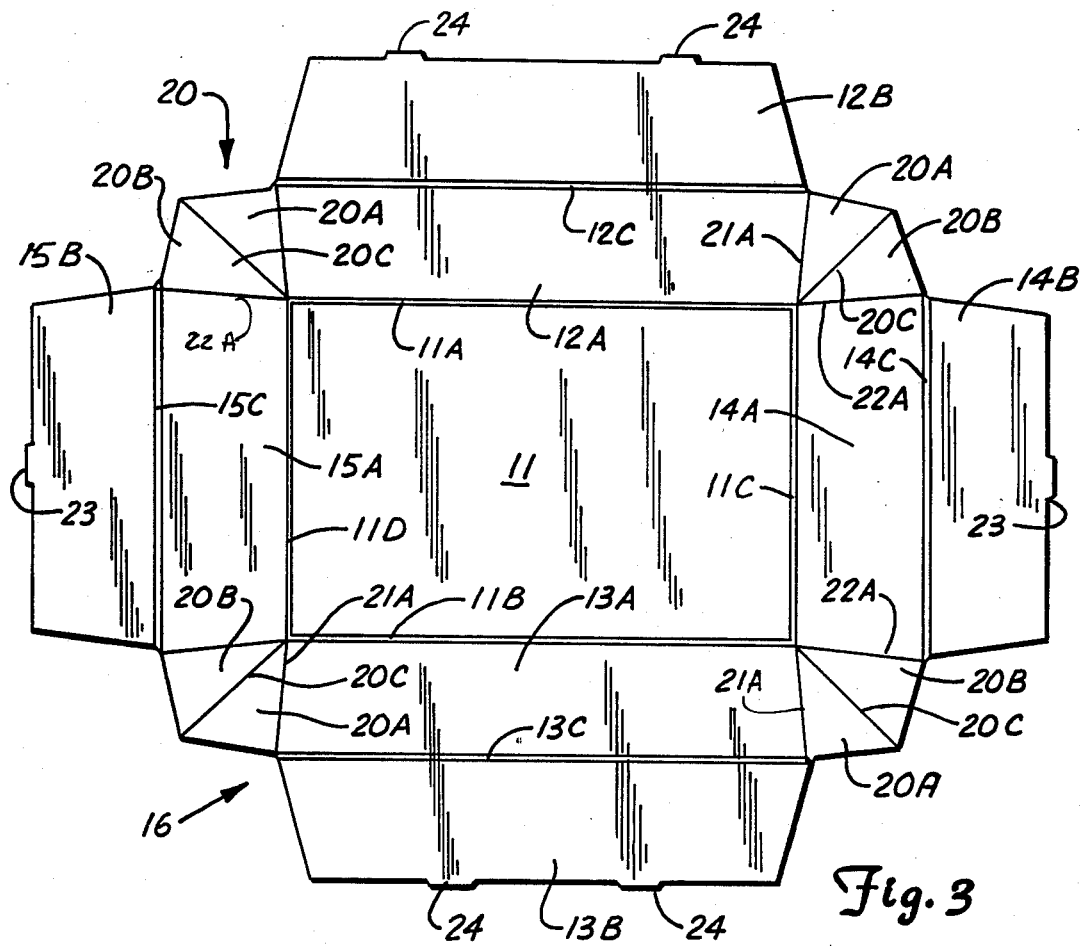
FIG. 3 is a flat layout of a box blank used for forming the outer container or box of the present invention.

A disposable cat litter box illustrated generally at 10 is formed out of a suitable cardboard material. The litter box 10 has a bottom wall 11, first and second side walls 12 and 13, and end walls 14 and 15 extending between the side walls. The walls have a double thickness and are formed of folded over panels. As seen in FIG. 3, the bottom wall 11 forms a main panel from a cardboard box blank indicated generally at 16. The bottom wall 11 is at the center. The first side wall 12 comprises a first panel 12A joined to the bottom wall 11 along a fold line 11A, and a second panel 12B that is joined to panel 12A along a fold line 12C. The second side wall 13 has a first panel 13A that is joined along a fold line 11B to the bottom wall 11. The side wall 13 includes a second outer panel 13B that is joined along a fold line 13C to the outer edge of the panel 13A.

The first end wall 14 is formed of an end wall panel 14A joined to the bottom wall 11 along a fold line 11C, and the end wall 14 includes a second panel 14B that is joined to the panel 14A along a fold line 14C.

The second end wall 15 has a first panel 15A that is joined to one end of the bottom wall 11 along a fold line 11D, and a second panel 15B is joined to the panel 15A along a fold line 15C.

The ends of the first panels of each of the side and end walls of the box 12A, 13A, 14A, and 15A are joined together at their adjacent edges with folding gussets indicated generally at 20. Each of the gussets 20 includes a first section 20A that is attached along fold lines 21A to the opposite ends of the side wall panels 12A and 13A, respectively. The gussets include second panels 20B that are attached to the panels 20A along fold lines 20C, and also are joined to the ends of the adjacent end panels 14A and 15A along fold lines 22A.

In formation of the box 10 from the box blank, the first end and side wall panels are folded upwardly relative to the bottom wall and the fold lines 20C of the gussets are folded inwardly so that the gusset panel fold lines 21A and 22A tend to move closer together. The folded gussets are folded along fold lines 22A placed against the end walls, so that the fold lines 20C face each other across the end of the box. The gussets then tuck against the end walls when the walls reach their tapered final position as shown in FIGS. 1 and 2. The gussets 20 will fold flat against the end walls 14A and 15A, at the opposite ends thereof, and then the second flaps 14B and 15B are folded inwardly about the fold lines 14C and 15C, respectively. Small tabs shown generally at 23 are provided at the outer edges of the end wall panels 14B and 15B. When the panels 14B and 15B are folded in, these tabs will provide a friction fit against the upper surface of bottom wall 11 to make a slight indentation and thus be retained in the position shown in FIG. 2.

The outer or second side wall panels 12B and 13B are then folded inwardly. The second side wall panels 12B and 13B have small tabs 24 at their outer edges, as shown, which frictionally fit against the upper surface of bottom wall 11 and hold the panels 13B and 12B in position tucked against the panels 12A and 13A. The second side wall panels 12B and 13B are held generally as shown for the end walls in FIG. 2, but slightly tighter because the gussets are not held in under the panels 12B and 13B.

The box 10 thus formed is rectilinear with tapered walls that taper upwardly and outwardly from the bottom wall 11. The outer dimensions of the bottom wall, where the fold lines 11A, 11B, 11C and 11D are made, is such that it will fit into the upper portions of a previously formed box along the upper edges defined by the folded lines 12C, 13C, 14C and 15C. In other words, the boxes will nest together.

Figure 4:
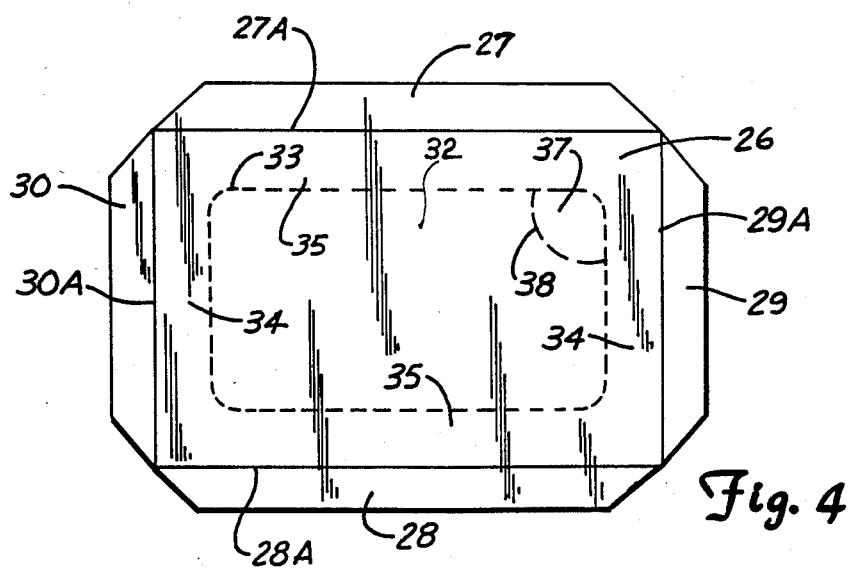
FIG. 4 is a flat layout of a cover wall used for covering litter that is shipped in the box.

A cover wall indicated generally at 25 is designed to be supported at a position spaced upwardly from the upper surface of the bottom wall 11, generally as shown in FIG. 2, and below the upper edges of the side and end walls. Cover wall 25 is also made of suitable cardboard or similar material. In the form shown, as can be seen in FIG. 4, the cover wall 25 comprises a center cover wall portion 26 and a first side support panel 27 joined to the edge of the center cover wall portion 26 along a fold line 27A. A second side support panel 28 is joined to the center cover wall portion 26 along a fold line 28A. A first end support panel 29 is joined to the center cover wall portion 26 along a fold line 29A, and a second end support panel 30 is joined to the center cover wall portion 26 along a fold line 30A.

The center cover wall portion 26 has a cover panel indicated generally at 32 that is of smaller size than the size defined by the fold lines 27A, 28A, 29A and 30A, and is defined by a perforation or partially punched-out lines indicated at 33 that define a substantially rectilinear opening leaving ledges 34 and 35 around the ends and sides, respectively, of the center cover wall portion 26. Additionally, a small tab or lift out portion indicated at 37 is partially punched out of the removable cover panel 32 along a perforation line 38 so that it can be punched-out separately and used as a finger grip to remove the cover panel 32 upwardly.

When in use, the box 10 is formed by folding up the walls and is then filled to a desired depth with kitty litter indicated generally at 40. The side support panels 27 and 28 and the end support panels 29 and 30 of the center cover wall portion 26 are all folded down along the respective fold lines 27A, 28A, 29A and 30A so that these support panels form support legs around the periphery of the center cover wall portion 26. As can be seen in FIG. 2, the cover 25 is then put into place with the end and side support panels bent less than 90° with respect to the center cover wall portion 26. The lower edges of the support panels 27, 28, 29 and 30 rest on the upper surface of the bottom wall 11. The box partially filled with litter is then ready for shipment. The snug fit of the center cover wall portion 26 is sufficient so that the kitty litter will not shake out, nor will the cover become easily dislodged.

The center cover wall portion, of course, can be supported on the side and end walls of the box in any desired manner, such as by separate tabs that fit into slots in the side and end wall panels of the box 10.

When the litter is to be used, the hand grip tab 37 is punched out along the perforations, and then the removable cover panel 32 is removed and the kitty litter is available to a cat or other animal for use. The side ledges inhibit scattering litter up and out of the box. When the litter has been used, the entire box is disposed of in suitable manner.

A low cost, easily transported disposable litter box is made and, as can be seen, the boxes can be stacked as indicated by the dotted lines in FIG. 2 to permit easy transport and shipment. The cardboard may be treated to be moisture resistant or waterproof if desired, the box maybe also be made of suitable plastic.

The boxes are also of a selected size so that they will fit onto a standard pallet conveniently, with a maximum storage availability.

Although the present invention has been described with reference to preferred embodiments, workers skilled in the art will recognize that changes may be made in form and detail without departing from the spirit and scope of the invention.

What is claimed is:

1. A cat litter box comprising side and end wall means forming a generally rectilinear box enclosure having a bottom wall with side edges and end edges;

side wall means and end wall means integral with the bottom wall along the side and end edges thereof, respectively, said side wall means and end wall means each tapering upwardly and outwardly from the respective edges of the bottom wall to an upper box edge, and each being formed by double panels that are integral and folded against each other along a fold line, respectively, outer edges of the side wall panels and end wall panels extending down toward the bottom wall from the fold lines, respectively, said upper box edge being formed by the fold lines of the side wall panels and end wall panels and defining a peripheral dimension greater than the periphery of the bottom wall to permit the lower portions of similar boxes to be stacked within the upper portions of one box;

a cover wall fitting within said rectilinear box enclosure and closely engaging the side and end wall means forming said enclosure;

wall means extending downwardly and integral with the cover wall portions extending along the side and end wall panels to support said cover wall spaced with respect to the bottom wall of the rectilinear enclosure and in position below the upper edges of the box, said cover wall and said integral wall means forming an insert with an open bottom, the outer edges of the side wall panels and end wall panels extending toward the bottom wall beyond said cover wall; and a filling of cat litter in the region below the cover wall.

2. The combination of claim 1 wherein the cover wall has a removable cover panel defined within it of substantial size in relation to the cover wall, said cover panel being removable to provide access to the kitty litter below the cover wall.

3. The apparatus as specified in claim 1 wherein said box is made of a suitable cardboard material.

4. The apparatus as specified in claim 1 wherein said cover wall is positioned upwardly from the bottom wall less than one half of the height of the side and end wall means forming the box.

5. The apparatus as specified in claim 1 wherein said cover wall defines an opening having edges spaced inwardly from the side wall means and end wall means separately to form ledges in the cover wall around the periphery of the cover wall to tend to retain kitty litter near the periphery of the box from being scattered out of the box along the wall means of the box.

* * * * *